US012467314B2

(12) United States Patent
Brisbin

(10) Patent No.: US 12,467,314 B2
(45) Date of Patent: Nov. 11, 2025

(54) ROLLER BLIND SYSTEM FOR STRAIGHT AND CURVED WINDOW SEGMENTS

(71) Applicant: Brian Brisbin, Toronto (CA)

(72) Inventor: Brian Brisbin, Toronto (CA)

( * ) Notice: Subject to any disclaimer, the term of this patent is extended or adjusted under 35 U.S.C. 154(b) by 277 days.

(21) Appl. No.: 18/315,631

(22) Filed: May 11, 2023

(65) Prior Publication Data

US 2024/0376772 A1 Nov. 14, 2024

(51) Int. Cl.
*E06B 9/42* (2006.01)
*E06B 9/72* (2006.01)
*E06B 9/40* (2006.01)

(52) U.S. Cl.
CPC .................. *E06B 9/42* (2013.01); *E06B 9/72* (2013.01); *E06B 2009/405* (2013.01)

(58) Field of Classification Search
CPC ........ E06B 9/42; E06B 9/72; E06B 2009/405; E06B 2009/2423
USPC .......................................................... 160/310
See application file for complete search history.

(56) References Cited

U.S. PATENT DOCUMENTS 516,018 A * 3/1894 Lauer ....................... B60J 1/205 160/262
1,071,158 A * 8/1913 Hurlbut .................. A47H 19/00 160/262
6,062,147 A * 5/2000 Footitt ................... A47B 17/00 108/50.01
11,358,442 B2 * 6/2022 Rockelmann .......... B60J 7/0015
2008/0216970 A1 * 9/2008 Lin .......................... B60J 1/205 160/262

OTHER PUBLICATIONS

Hunter Douglas Architectural, RB 500+ Single Universal Mount—Section Detail, Jan. 19, 2021, [https://www.hunterdouglasarchitectural.com/services/indemnity.jsp?fileType=pdf&cadItemId=3008&catId=RB500&newWindow=false].

Hunter Douglas Architectural, RB 500+ Dual Universal Mount—Section Detail, Nov. 4, 2020, [Taken from URL: https://www.hunterdouglasarchitectural.com/services/indemnity.jsp?file Type=pdf&cadItemId=2968&catId=RB500&newWindow=false].

(Continued)

*Primary Examiner* — Beth A Stephan
(74) *Attorney, Agent, or Firm* — Forsgren Fisher McCalmont DeMarea Tysver LLP; James M. Urzedowski; Daniel A. Tysver

(57) ABSTRACT

The present disclosure describes a roller blind assembly configured for deployment along a curved window segment. The roller blind assembly including a housing having a hollow body formed with a longitudinal passageway. A guide with a profile being conformable to the curved window segment. The guide having a guide channel and being alignable with the longitudinal passageway. The roller blind assembly including a flexible toothed gear rack to be received within the longitudinal passageway and guide. A drive assembly mountable within the hollow body of the housing; the drive assembly including a motor, a worm operatively connected to the motor and a toothed worm wheel configured to engage the teeth formed on the upper portion of the toothed gear rack to urge lateral displacement of the toothed gear rack relative to the longitudinal passageway and the guide, and a blind attachable to a lower portion of the toothed gear rack.

20 Claims, 10 Drawing Sheets

(56) References Cited

OTHER PUBLICATIONS

Hunter Douglas Architectural, RB 500 Roller Shades Specification Catalog, 2010, [Taken from URL: https://assets.hunterdouglasarchitectural.com/documents/RB500/RB500_Spec_Cat_HDA.pdf?_rand=1581112236000].

Hunter Douglas Architectural, RB 500+ Automated Roller Shades, Website, 2004, https://www.hunterdouglasarchitectural.com/windowcoverings/rollershades/RB500/index.jsp.

* cited by examiner

ROLLER BLIND SYSTEM FOR STRAIGHT AND CURVED WINDOW SEGMENTS

FIELD OF INVENTION

The present disclosure relates generally to roller blind systems for windows and more specifically, to roller blind assemblies for straight and curved windows.

BACKGROUND OF THE INVENTION

With the advent of modern architecture, buildings with different shapes and designs have been realized. Design features such as, high ceilings with large windows, and curved windows have been incorporated into buildings with additional frequency. Curved windows advantageously provide more light and more expansive views for the individuals inside the buildings.

However, with curved windows comes the problem of providing blinds or shades for said curved windows. In prior art solutions, multiples segments of straight roller blinds or shades were used, where each segment had its own individual roller blind of shade. However, with lengthy sections of curved windows, or combinations of curved and straight windows, a significant number of individual roller blinds or shades would need to be employed. Not only would this not provide an aesthetically pleasing window covering solution, but it would also lead to high capital costs, increased maintenance and increased potential points of failure. Accordingly, there appears to be a need for an aesthetically pleasing window covering solution for providing blinds for curved windows, It would be further advantageous if such a solution was mechanized.

SUMMARY OF INVENTION

According to a broad aspect of the present invention, there is provided a roller blind assembly configured for deployment along a curved window segment. The roller blind assembly includes a housing having a hollow body formed with a longitudinal passageway. The longitudinal passageway has a gap along a lower margin thereof, and the housing being fixable to one of a ceiling and a wall. The roller blind assembly further includes a guide mountable to one of the ceiling and the wall adjacent to the curved window segment. The profile of the guide is conformable to a curved profile of the curved window segment. The guide further has a guide channel. The guide channel has a gap along a lower margin thereof and is alignable with the longitudinal passageway. The roller blind assembly also includes a flexible toothed gear rack configured to be received within the longitudinal passageway and the guide for lateral displacement relative thereto. The toothed gear rack has an upper portion and a lower portion. The upper portion is formed with spaced apart teeth. In addition, the roller blind assembly includes a drive assembly mountable within the hollow body of the housing. The drive assembly includes a motor, a worm operatively connected to the motor and a toothed worm wheel configured to engage the teeth formed on the upper portion of the toothed gear rack to urge lateral displacement of the toothed gear rack relative to the longitudinal passageway and the guide. Also provided, is a blind attachable to a lower portion of the toothed gear rack. When the roller blind assembly is deployed along a curved window segment, the toothed gear rack is movable laterally between a fully retracted position and fully extended position. When the toothed gear rack is in the fully retracted position, the toothed gear rack is contained within the longitudinal passageway, the blind protrudes from the gap in the lower margin of the longitudinal passageway, and the curved window segment remains uncovered by the blind. When the toothed gear rack is in the fully extended position, a majority portion of the toothed gear rack is contained within the guide, the blind protrudes from the gap in the lower margin of the guide channel, and the curved window segment is covered by the blind.

In one feature, the housing of the roller blind assembly may be cylindrical.

In another feature, the roller blind assembly may further include a blind lowering and raising mechanism operable to move the blind between a fully unfurled position and a fully wound position, when the toothed gear rack is in the fully retracted position.

In a further feature, the housing of the roller blind assembly may have an outer surface around which the blind is wound when in the fully wound position.

In yet another feature, the blind lowering and raising mechanism includes a gear with an outer surface provide with projecting structures keyed for engagement with corresponding internal protuberances formed within the housing. The blind lowering and raising mechanism further includes a motor operatively connected to the gear to rotatably drive the gear and the housing. Also provided is a bearing sleeve attached to the motor and the inner surface of the hollow body of the housing. The bearing sleeve is configured to hold the motor fixedly in place while the housing rotates about the motor.

In still another feature, the housing has a first end and a second end. The blind lowering and raising mechanism may be arranged within the housing in proximity to the first end thereof, and the drive assembly may be arranged within the housing in proximity to the second end thereof.

In an additional feature, the drive assembly may also include at least one motor mount for fixedly holding the drive assembly within the housing. The at least one motor mount may be a plate with outer edges keyed for engagement with the corresponding internal protuberances formed within the housing.

In a further feature, The roller blind assembly may also include an access gap between the longitudinal passageway and the hollow body of the housing. The toothed worm wheel of the drive assembly is configured to engage the teeth formed on the upper portion of the toothed gear rack through the access gap.

In another feature, the toothed gear rack may have a generally circular profile.

In a further feature, the longitudinal passageway may have a generally penannular profile.

In still another feature, the guide may have an upper portion, two opposing side portions depending from either ends of the upper portion and two curved converging lower portions extending away from the side portions, the gap along the lower margin of the longitudinal passageway being located between the two curved converging lower portions.

Optionally, the guide may be substantially the same length as the toothed gear rack.

Preferably, the guide may be made of a smooth material. The smooth material may be selected from the group consisting of: (a) a metal; and (b) a polymer.

In an additional feature, the lower portion of the toothed gear rack may include a clamping mechanism for fixedly retaining an edge of the blind. The clamping mechanism may include two opposing arm portions for holding the blind therebetween.

In one optional feature, the housing may be made of aluminium.

According to another aspect of the present invention, there is provided a roller blind assembly configured for deployment along a curved window segment. The roller blind assembly includes a housing having a hollow body formed within a longitudinal passageway. The longitudinal passageway has a gap along lower margin thereof. The housing is fixed to one of a ceiling or a wall. The roller blind assembly further includes a guide mounted to one of the ceiling or the wall adjacent to the curved window segment. The profile of the guide conforms to a curved profile of the curved window segment. The guide has a guide channel. The guide channel has a gap along a lower margin thereof and being aligned with the longitudinal passageway. The roller blind assembly also includes a flexible toothed gear rack configured to be received within the longitudinal passageway and the guide for lateral displacement relative thereto. The toothed gear rack has an upper portion and a lower portion. The upper portion is formed with spaced apart teeth. The roller blind assembly includes a drive assembly mounted within the hollow body of the housing. The drive assembly includes a motor, a worm operatively connected to the motor and a toothed worm wheel configured to engage the teeth formed on the upper portion of the toothed gear rack to urge lateral displacement of the toothed gear rack relative to the longitudinal passageway and the guide. Also, provided is a blind attached to a lower portion of the toothed gear rack. The toothed gear rack is movable laterally between a fully retracted position and a fully extended position. When the toothed gear rack is in the fully retracted position, the toothed gear rack is contained within the longitudinal passageway, the blind protrudes from the gap in the lower margin of the longitudinal passageway, and the curved window segments remains uncovered by the blind. When the toothed gear rack is in the fully extended position, a majority portion of the toothed gear rack is contained within the guide, the blind protrudes from the gap in the lower margin of the guide channel, and the curved window segment is covered by the blind.

According to yet another aspect of the present invention, there is provided a roller blind assembly configured for deployment along straight and curved window segments. The roller blind assembly includes a housing having a hollow body formed within a longitudinal passageway. The longitudinal passageway has a gap along a lower margin thereof. The housing is fixed to one of a ceiling or a wall. The roller blind assembly further includes a guide mounted to one of the ceiling or the wall adjacent to the straight and curved window segments. The guide includes at least a straight portion and a curved portion. A first profile of the straight portion guide conforms to a straight profile of the straight window segment, and a second profile of the curved portion conforms to a curved profile of the curved window segment. The guide has a guide channel. The guide channel has a gap along a lower margin thereof and is aligned with the longitudinal passageway. The roller blind assembly also includes a flexible toothed gear rack configured to be received within the longitudinal passageway and the guide for lateral displacement relative thereto. The toothed gear rack has an upper portion and a lower portion. The upper portion is formed with spaced apart teeth. The roller blind assembly includes a drive assembly mounted within the hollow body of the housing. The drive assembly includes a motor, a worm operatively connected to the motor and a toothed worm wheel configured to engage the teeth formed on the upper portion of the toothed gear rack to urge lateral displacement of the toothed gear rack relative to the longitudinal passageway and the guide. The roller blind assembly also includes a blind attached to a lower portion of the toothed gear rack. The toothed gear rack is movable laterally between a fully retracted position and fully extended position. When the toothed gear rack is in the fully retracted position, the toothed gear rack is contained within the longitudinal passageway, the blind protrudes from the gap in the lower margin of the longitudinal passageway, and the straight and the curved window segments remain uncovered by the blind. When the toothed gear rack is in the fully extended position, a majority portion of the toothed gear rack is contained within the guide, the blind protrudes from the gap in the lower margin of the guide channel, and the straight and the curved window segments are covered by the blind.

BRIEF DESCRIPTION OF THE DRAWINGS

The embodiments of the present invention shall be more clearly understood with reference to the following detailed description of the embodiments of the invention taken in conjunction with the accompanying drawings, in which.

DESCRIPTION OF THE PREFERRED EMBODIMENTS OF THE INVENTION

Figure 1:
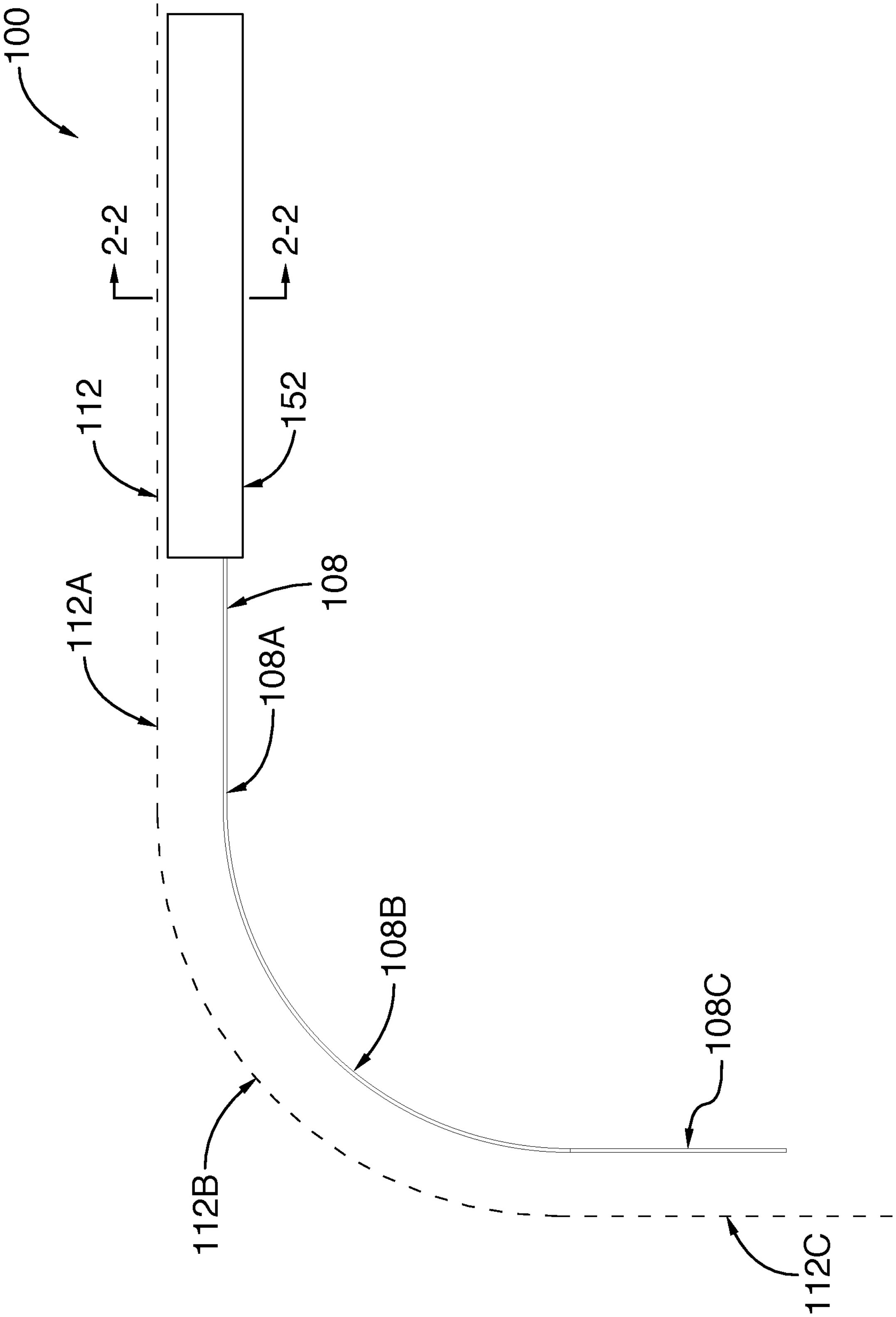
FIG. 1 is a schematic top plan view of a roller blind system and associated guide installed adjacent straight and curved window segments in accordance with an embodiment of the present invention.

The description, which follows, and the embodiments described therein are provided by way of illustration of an example, or examples of particular embodiments of principles and aspects of the present invention. These examples are provided for the purposes of explanation and not of limitation, of those principles of the invention. In the description that follows, like parts are marked throughout the specification and the drawings with the same respective reference numerals.

Figure 2:
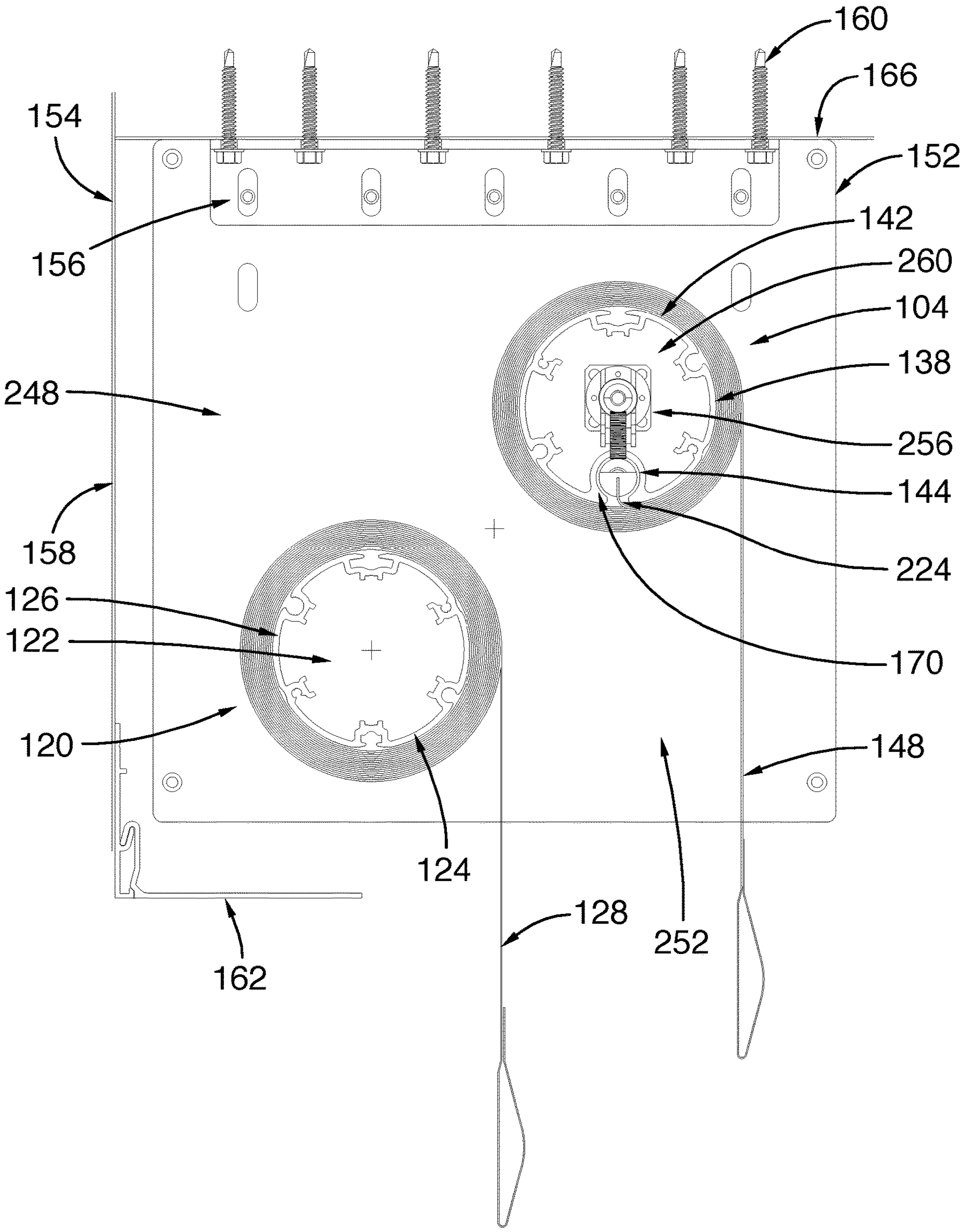
FIG. 2 is a cross-sectional view of the roller blind system shown in FIG. 1 taken along line '2-2', depicting a first roller blind assembly for the straight window segment and a second roller blind assembly for the curved window segment both attached to a mounting plate affixed to a wall or other support structure.

Referring to FIGS. 1 and 2, there is provided a roller blind system 100 configured to cover one or more windows or window segments (designated generically with reference numeral 112). In this embodiment, the window 112 includes a first straight window segment 112A, a second curved window segment 112B and a third straight window segment 112C. A straight window segment may be defined as a window that has a straight profile when seen from a top plan view. Similarly, a curved window segment may be defined as a window that has a curved profile when seen from a top plan view.

In other embodiments, the window 112 could be configured differently than as shown. For example, the window could comprise a curved window segment only. Alternatively, the window could comprise multiple curved segments forming an S-like shape. A person skilled in the art will recognize that other window configurations are possible.

The roller blind system 100 includes a first roller blind assembly 120 configured to cover straight window segments 112A (also, referred to as the straight roller blind assembly 120), a second roller blind assembly 104 configured to cover curved window segments 112B (also, referred to as the curved roller blind assembly 104) and a housing 152 within which are arranged the straight roller blind assembly 120 and the curved roller blind assembly 104. It will be appreciated by a person skilled in the art that in other embodiments additional roller blind assemblies (either straight or curved roller blind assemblies) could be provided to cover additional (straight or curved) window segments. Alternatively, in embodiments where only a curved window segment needs to be covered, window covering system could be provided with a single curved roller blind assembly.

In the current embodiment, housing 152 is mounted to the ceiling above windows or window segments 112. Specifically, housing 152 is mounted to the ceiling above first straight window segment 112A. In alternate embodiments, where window 112 includes only a single curved window segment, housing 152 would be mounted adjacent to the curved window segment, along the top of a straight segment of wall. A person skilled in the art will recognize the different available placements of housing 152 along either straight window segments or straight wall segments based on different potential window 112 configurations.

In the current embodiment, housing 152 is mounted to the ceiling above windows or window segments 112 by a bracket 156, and a plurality of screws 160. While only a single bracket is depicted in FIG. 2, a plurality of brackets 156 may be used to securely fasten housing 152 to the ceiling. In the current embodiment, bracket 156 is a L-shaped bracket, but may be of any shape or size. It will occur to a person skilled in the art that various configurations of brackets 156 and screws 160 may be used to securely attach housing 152 to the ceiling. Housing 152 may also be mounted on the wall above window 112, in which case, brackets 156 and screws 160 may be located along the inner surface of the hollow body of housing 152 that is in contact with the wall. It is also contemplated that there may be other methods of securing housing 152 to a surface above window 112, including, but not limited to rivets or wall anchors. A person skilled in the art will recognize the different configurations and surfaces to secure housing 152 against, and also the various mechanisms for attaching housing 152 to said surfaces.

Referring to FIG. 2, housing 152 includes a ceiling plate 166, a front plate 158, a left plate (not visible in the cross-section illustrated) and a right plate 248 arranged at either end of housing 152. In alternate embodiments, housing 152 may include additional plates to further enclose components within housing 152, such as a rear plate (not shown). In another alternate embodiment, the housing 152 could be omitted altogether in favor of providing left plate and right plate 248 only. A person skilled in the art will recognize the different configurations for housing 152.

Also mounted to the ceiling is valance 154 configured to provide a protective and/or decorative cover. Valence 154 may be made of any number of horizontal or vertical sections to cover components within housing 152. In the embodiment depicted in FIG. 2, the valance 154 includes the front plate 158 and a lower horizontal section 162, both of which cover the components within housing 152. With vertical section 158 against window 112, vertical section 158 provides a covering for the components within housing 152 for users looking from the exterior into window 112. In alternative embodiments, vertical section 158 may be facing inwards towards the interior of the building, providing a covering of the components within housing 152 for users looking from the interior towards window 112. Alternatively, both sides of housing 152, from the viewpoint from the exterior of the window and from the viewpoint from the interior of the building, may be covered with valance 154 through the addition of a rear plate (not shown). A person skilled in the art will recognize the different potential layouts for valance 154 in relation to housing 152.

The ceiling plate 166, the front plate 158, the left plate and the right plate 248 define a space 252 therebetween for accommodating the first straight roller blind assembly 120 and the second curved roller blind assembly 104. Within space 252, the first straight roller blind assembly 120 and the second curved roller blind assembly 104 extend between left and right plates 248 and are arranged parallel to each other. As can be seen in FIG. 2, in the current embodiment, the first straight roller blind assembly 120 is located closer to window segment 112A than the second curved roller blind assembly 104. More specifically, the first straight roller blind assembly 120 is located adjacent the front plate 158. Moreover, in the current embodiment, the second curved roller blind assembly 104 is carried closer to the ceiling plate 166 than the first straight roller blind assembly 120.

With this configuration, a person looking at window 112 from the interior of the room, will only see the second curved roller blind assembly 104, as blind 128, whether retracted or extended, will obstruct the view of the first straight roller blind assembly 120. In an alternate configuration, the arrangement of the first straight roller blind assembly 120 and the second curved roller assembly 104 could be reversed in that the first straight roller assembly 120 could be located away from window 112, and second curved roller blind assembly could be located next to window 112, and the first straight roller blind system 104 could be carried closer to the ceiling than the second straight roller blind assembly 104. A person skilled in the art will recognize that there may be different configurations for positioning the roller blind assemblies 104 and 120 within space 252 of housing 152.

Referring to FIG. 2, the straight roller blind assembly 120 is a conventional straight roller blind assembly known in the art. It includes a hollow cylindrical roller blind housing 124 and a blind 128 wound or rolled about or around the outer surface 126 of the cylindrical roller blind housing 124. The cylindrical roller blind housing 124 is attached at either left plate or right plate 248 of housing 152, but can freely rotate relative thereto on account of an arrangement of bearings (not shown, but known to those skilled in the art) provided to the cylindrical roller blind housing 124. Cylindrical roller blind housing 124 may be urged to rotate either in one direction to lower blind 128 to cover the first straight window segment, or in the opposite direction to raise blind 128 to uncover the first straight window segment 112A. In this embodiment, rotation of the cylindrical roller blind housing 124 in a clockwise direction lowers the blind 128 and rotation of the cylindrical roller blind housing 124 in a counter clockwise direction raises the blind 128. A person skilled in the art will recognize that the rotational direction of cylindrical roller blind housing 124 is dependent on the orientation of the first roller blind assembly 120 relative to the window 112. Blind 128 does not translate laterally (i.e. it is not capable of lateral displacement), and is fixed relative to the first straight window segment 112A.

Blind 128 of straight roller blind assembly 120 may be lowered or raised either through manual means, or through motorized means. In the current embodiment, a motor assembly (not shown) arranged within the hollow space 122 of cylindrical roller blind housing 124 is operable to drive rotation the cylindrical roller blind housing 124 to either lower (unroll) or raise (roll) the blind 128. The arrangement of the motor assembly within the hollow space 122 of cylindrical roller blind housing 124 will be known to those skilled in the art.

In the preferred embodiment, the cylindrical roller blind housing 124 is made of extruded aluminum. In alternative embodiments, the cylindrical roller blind housing 124 may be made out of a different materials, such polymers or other metals.

Blind 128 is a rectangular sheet of flexible material capable of being wound about the outer surface 126 of the cylindrical roller blind housing 124. It may be made out of a variety of materials, cloths or fabrics using natural or man-made fibers, and having different opacities to allow more or less light in to the room, or other properties.

Figure 3:
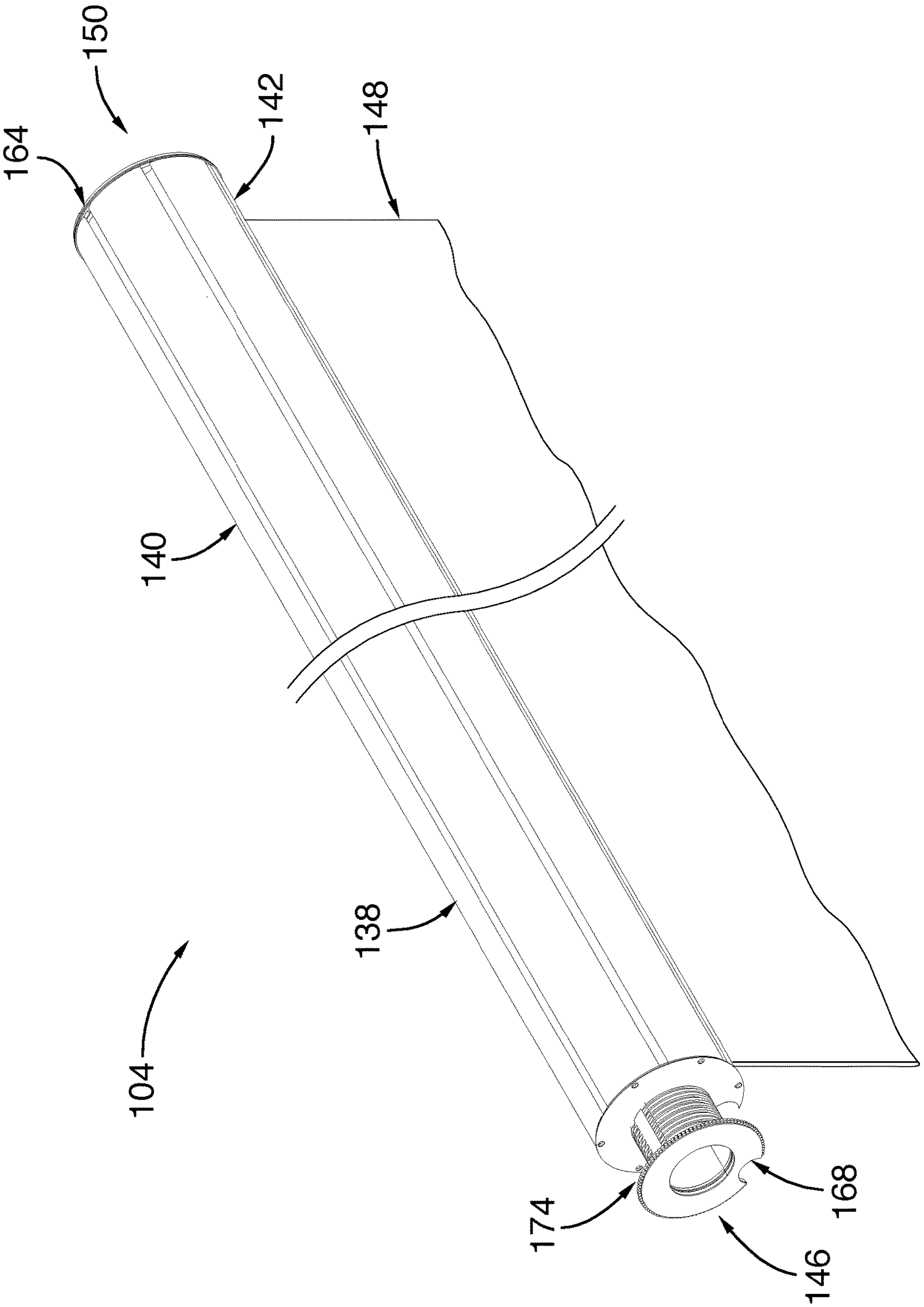
FIG. 3 is an isolated front left perspective view of the second roller blind assembly, shown in FIG. 2, with the guide omitted.
Figure 4:
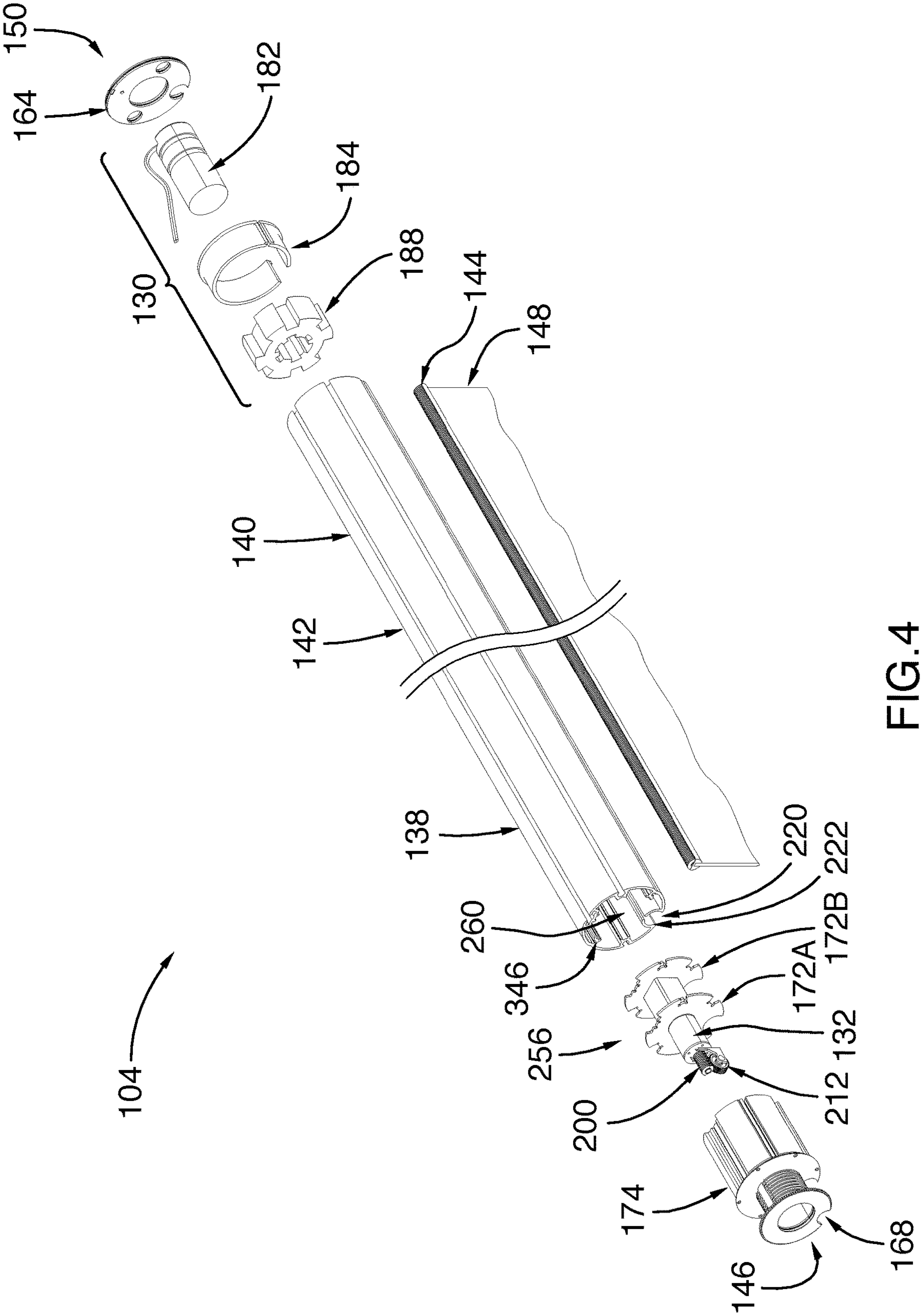
FIG. 4 is an exploded front left perspective view of the second roller blind assembly illustrated in FIG. 3 showing the housing for the second roller blind assembly, a portion of the blind lateral displacement mechanism within the housing, the blind lowering and raising mechanism, and the blind.

Referring to FIGS. 2, 3 and 4, the main components of the curved roller blind assembly 104 include a hollow cylindrical roller blind housing 140 (also referred to herein as cylindrical housing 140), a blind lateral displacement mechanism 256, a blind 148 connected to a portion of the blind lateral displacement mechanism 256 and configured to be wound or rolled about or around the cylindrical roller blind housing 140, and a blind 148 lowering and raising mechanism 130.

Hollow cylindrical roller blind housing 140 has a first end 150, a second end 146 and a substantially cylindrical elongated body 142 extending between the first end 150 and second end 146 thereof. A hollow 260 formed within the body 142 accommodates the blind 148 lowering and raising mechanism 130, and a portion of the blind lateral displacement mechanism 256. More specifically, in the current embodiment shown in FIG. 4, the lowering and raising mechanism 130 is arranged in proximity to first end 150, and blind lateral displacement mechanism 256 is arranged in proximity to second end 146.

Running along a substantial portion of the length of the body 142 and formed into the lowermost margin 222 of the body 142 is a longitudinal passageway 220 which is sized to receive a portion of the blind lateral displacement mechanism 256, more specifically, the gear rack 144. The longitudinal passageway 220 has an opening 168 at the second end 146 to allow a portion of the gear rack 144 to travel laterally in and out of longitudinal passageway 220. The lateral movement of gear rack 144 will be further explained in greater detail below. As best shown in FIG. 2, the longitudinal passageway 220 further has a generally penannular profile, there being a small gap 224 defined between the opposed portions 170 of the body 142 at the lowermost margin 222. A person skilled in the art will recognize that longitudinal passageway 220 could be configured with the different profiles. The gap 224 is sized to provide sufficient clearance to allow the blind 148 that depends from the gear rack 144 to extend therethrough. As explained in greater detail below, the opposed portions 170 of the body 142 which define the longitudinal passageway 220 act as a guide for the gear rack 144 as it travels along the cylindrical roller blind housing 140 through longitudinal passageway 220. Hollow cylindrical roller blind housing 140 also has an outer surface 138 around which blind 148 may be wound.

In the preferred embodiment, the cylindrical roller blind housing 140 is made of extruded aluminum. In alternative embodiments, the cylindrical roller blind housing 140 may be made out of a different materials, such polymers or other metals.

Figure 5:
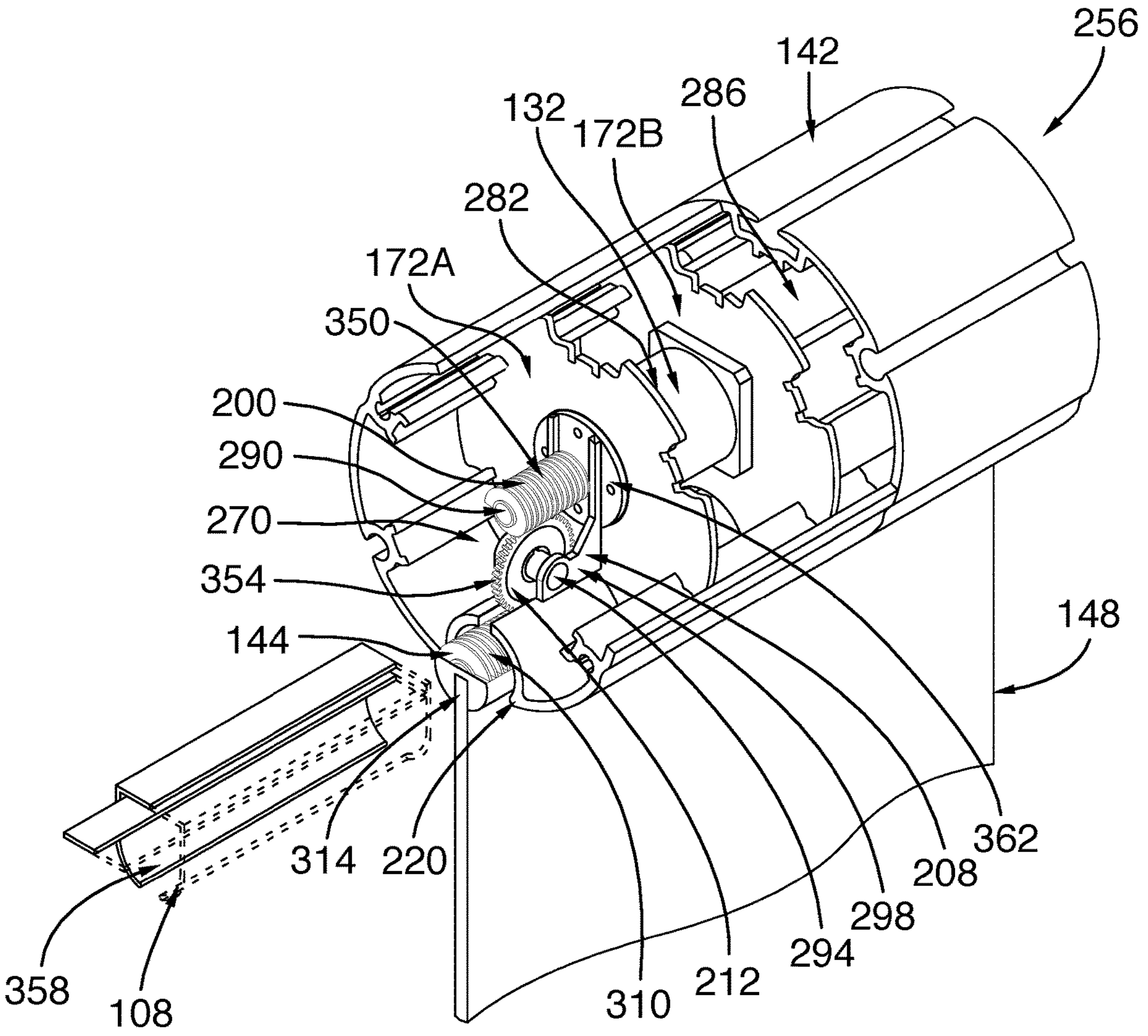
FIG. 5 is an enlarged front left perspective view of a section of the second roller blind assembly of FIG. 3 proximate the left end thereof where a quarter section of the housing of the second roller blind assembly has been removed to better reveal details of the blind lateral displacement mechanism.

As best seen in FIG. 5, the blind lateral displacement mechanism 256 includes a first motor mount 172A, a second motor mount 172B, a motor 132 and a worm drive gear arrangement 270 operatively connected to the motor 132, and a guide 108. The motor mounts 172A and 172B, the motor 132 and a portion of the worm drive gear arrangement 270 are disposed within the hollow 260 adjacent the second end 146 of the body 142, while the guide 108 is disposed outside the hollow 260 in proximity to the second end 146 of body 142. Motor mounts 172A and 172B are plates that are configured to fit onto a portion of the motor 132 in surrounding relation therewith to hold it in place. Motor mounts 172A and 172B each also have outer edges 278A and 278B respectively that are keyed for engagement with corresponding internal protuberances 346 formed within the cylindrical housing 140 and protruding into the hollow 260. The engagement of outer edges 278A and 278B of the motor mounts 172A and 172B with the internal protuberances 346 of the housing 140 ensure that the motor mounts 172A and 172B (and the motor 132 retained therein) are fixed for rotation with cylindrical housing 140, during winding (raising) and unwinding (lowering) of the blind 148. Furthermore, the motor mounts 172A and 172B hold motor 132 in place to prevent movement of the and to ensure worm 200 and worm wheel 212 properly engage with each other. While in the current embodiment, motor mounts 172A and 172B are used to hold motor 132 in place, it will occur to a person skilled in the art that there are other means of holding motor 132 in place, such as a single motor mount, or a series of mounting brackets, as long as motor 132 is in a fixed position despite the rotation of cylindrical housing 140.

The motor 132 has first and second portions 282 and 286. The first portion 282 is configured to be retained by the motor mounts 172A and 172B, and is located between motor mounts 172A and 172B. The second portion 286 extends beyond motor mount 172A and includes a drive shaft 290 that can be urged to rotate when the motor 132 is actuated. In the preferred embodiment, the motor 132 is an electrical motor. Motor 132 may also be connected to a controller (not shown). While first and second portions 282 and 286 of motor 132 are depicted in FIG. 5 as having different shapes, specifically where first portion 282 is in the shape of a rectangular prism, and second portion 286 is in the shape of a cylinder, it will occur to a person skilled in the art that motor 132 may be of any shape of size, and may of a singular body rather than two portions. A person skilled in the art will also recognize that motor mounts 172A and 172B respectively may also be shaped according to the profile of motor 132 to hold motor 132 in place.

Turning now to the worm drive gear arrangement 270, it includes a worm 200 operatively connected to the drive shaft 290, a worm wheel 212 and the gear rack 144. Both the worm 200 and the worm wheel 212 are arranged within the hollow 260 of the cylindrical housing 140 at a location in proximity to opening 168 of the longitudinal passageway 220 The gear rack 144 is contained within the longitudinal passageway 220, but can translate laterally therealong (as explained below). Along a portion of the uppermost margin 226 of the longitudinal passageway 220, gap 230 is provided to allow worm wheel 212 access to engage with gear rack 144 within longitudinal passageway 220. In the current embodiment, gap 230 is rectangular in shape and has a size that is slightly larger than that of worm wheel 212. A person skilled in the art will recognize that gap 230 may be of any shape along the uppermost margin 226 of longitudinal passageway 220, so long as it has clearance and does not interfere with the engagement between worm wheel 212 and gear rack 144.

Worm 200 has an elongated body whose outer surface is provided with helical threading 350 that is configured for engagement with the teeth 354 of the worm wheel 212. Worm wheel 212 is rotatively mounted on a shaft 294 that is held between two opposing mounting plates 298 and 302 that make up the worm wheel mounting bracket 208. The bracket 208 is itself attached to the body of motor 132 at a location 362 adjacent the proximal end of the worm 200. The worm wheel 212 is positioned below the worm 200 with its axis of rotation perpendicular to the axis of rotation of the worm 200 so that the threading 350 on the worm 200 can be made to contact and engage with the teeth 354 of the worm wheel. When the motor 132 is actuated, the drive shaft 290 (and the worm 200) are urged to rotate. As the worm 200 turns, its helical threading 350 engages the teeth 354 of the worm wheel 212 causing it to rotate as well. As explained in greater detail below, the rotation of the worm wheel 212 in turn causes the lateral displacement of the gear rack 144.

In alternate embodiments, worm wheel mounting bracket 208 may also be mounted to different surfaces. For example, worm wheel mounting bracket 208 may have opposing mounting plates 298 and 302 attached to motor mounting plate 172A, or to the inner surface of cylindrical body 142. A person skilled in the art will recognize that worm wheel mounting bracket 208 may be attached to other components in proximity to motor 132, as long as worm wheel 212 maintains its contact and engagement with worm 200 and gear rack 144 during any rotational movement of cylindrical body 142.

Worm 200 and worm wheel 212 may be of any suitable material, for example, a metal or a polymer. Preferably, the worm 200 and the worm wheel 212 are made of a hardened material that will not wear or break over an extended period of time.

The gear rack 144 is a flexible member which may be made of any suitable material capable of being elastically deformed, for example, plastics or rubbers. The flexibility of the gear rack 144 allows it to bend to adapt to the profile of the guide 108 as it travels therealong.

Along its upper portion, the gear rack 144 is provided with a plurality of spaced apart disc-like, upwardly protruding projections that act as gear teeth 310 for engagement with the teeth 354 of the worm wheel 212. The gap 230 allows the teeth 354 of the worm wheel 212 to engage the gear teeth 310 of the gear rack 144. The lower portion of the gear rack 144 incorporates a clamping mechanism 314 configured to fixedly retain an edge of blind 148. More specifically, the clamping mechanism 314 includes two opposed arm portions between which the blind 148 may be arranged.

The gear rack 144 can be seen to have a generally circular profile that conforms to that of the longitudinal passageway 220. A person skilled in the art will recognize that gear rack 144 could be configured with the different profiles. As previously described, the gear rack 144 may be housed within, and slidably driven along, the longitudinal passageway 220. While retained within longitudinal passageway 220, the projections 310 of gear rack 144 may engage with the teeth 354 of the worm wheel 212 such that the rotational movement of the worm wheel 212 translates into lateral movement of the gear rack 144 along the longitudinal passageway 220.

Figure 7A:
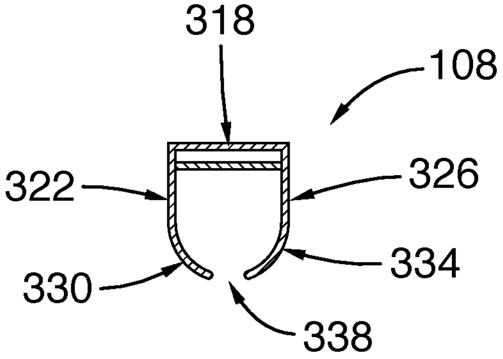
FIG. 7A is a cross-sectional view of the guide shown in FIG. 6A taken along line '7A-7A', depicting the guide without the gear rack extending therein.
Figure 7B:
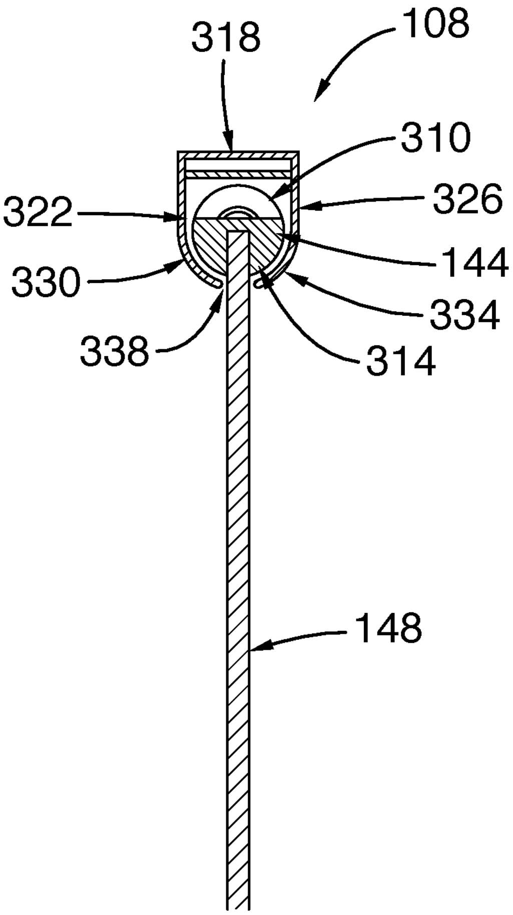
FIG. 7B is a cross-sectional view of the guide illustrated in FIG. 6C taken along line '7B-7B' showing the gear rack arranged within the guide.

As the gear rack travels out of the longitudinal passageway 220, its motion is constrained by guide 108. The guide 108 is configured to receive and support the gear rack 144 along the top of window 112 as it is driven out of the longitudinal passageway 220 by the action of the worm 200, the worm wheel 212 and the motor 132. Referring to FIGS. 7A and 7B, in the current embodiment, the guide 108 is an a five-sided elongated member defined by an upper portion 318, two opposing side portions 322 and 326 depending from either ends of the upper portion, two curved converging lower portions 330 and 334, and a gap 338 between the two converging lower portions 330 and 334. The gap 338 allows the blind 148 hanging off of the gear rack 144 to pass through.

Upper portion 318, or either of the two opposing side portions 322 and 326 may be used to mount guide 108 to the ceiling or to the wall above window 112. The placement of guide 108 will be discussed further below.

The upper portion 318, the side portions 322 and 326, the converging lower portions 330 and 334 cooperate with each other to define a guide channel 358. In alternative embodiments, the guide channel 358 may have a generally penannular profile that substantially matches that of the longitudinal passageway 220. Generally, the guide 108 is shaped to provide proper support and guidance of the gear rack during deployment of the blind 148 to cover the window segments.

A person skilled in the art will recognize that the guide channel 358 could be configured with the different profiles. Preferably, the guide 108 has the same or substantially the same length as the gear rack. In other embodiments, the guide may be shorter in length than the gear rack to ensure that blind 148 reaches the end of guide 108 to cover all of window 112.

The guide 108 may be made of a variety of smooth materials, such as polymers or metal. The smooth materials reduce friction between the gear rack assembly 144 and the guide 108 during lateral displacement/travel. In a preferred embodiment, guide 108 is extruded aluminum. In alternative embodiments (not shown), guide 108 may further include components along any of the portions of guide 108 within guide channel 358 to aid in the smooth travel of gear rack assembly 144. For example, small roller wheels may be placed along portions of guide 108 to further reduce friction during the transit of gear rack assembly 104 through guide 108. A person skilled in the art will recognize different possible friction reducing alternatives that may be provided within guide channel 358 of guide 108.

Referring to FIGS. 1 and 5, guide 108 is located and mounted along the top of window 112 conforming to its profile. In this embodiment, the guide 108 includes straight sections that are located above straight window segments 112A and 112C and a curved section that is located above curved window segments 112B. As gear rack 144 is driven by motor 132 laterally from within longitudinal passageway 220 along guide 108, the blind 148 is drawn along the top periphery of window 112 thereby covering same. It will be appreciated that the gear rack 144 is supported at all times whether by the longitudinal passageway 220, or by the guide 108. A person skilled in the art will recognize that the guide could be laid out differently depending on the layout of the windows to be covered.

For ease of construction and installation, the guide 108 may be made in multiple pieces with each piece or segment corresponding to a separate window segment. Where multiple pieces may be used for guide 108, the potential for gear rack assembly 144 to be interrupted during travel is increased, and as such, the connection between the multiple pieces should be as seamless as possible and gaps between pieces of guide 108 should be minimized. In alternate embodiments, where guide 108 runs a shorter distance, or if cost is less of an issue, guide 108 may be made as a single piece.

While in a preferred embodiment, blind lateral displacement mechanism 256 is configured to drive the gear rack 144 and blind 148 through motorized means, in alternate embodiments, manual means may be used to urge the blind 148 to travel laterally to cover window segments.

With reference now to FIGS. 3 and 4, the blind lowering and raising mechanism 130 is now described in greater detail. In the current embodiment, the mechanism 130 is accommodated within the hollow space 260 of cylindrical roller blind housing 140. Blind lowering and raising mechanism 130 includes a motor 182 operable to rotate the cylindrical roller blind housing 140 so as to cause the blind 148 to wind or unwind around the outer surface 138 of the cylindrical housing 140, a bearing sleeve 184 and a gear 188. In the preferred embodiment, the motor 182 is an electrical motor whose specifications are within the knowledge of a person skilled on the art. Motor 182 may also be connected to a controller (not shown).

The motor 182 may be mounted to cylindrical roller blind housing 140 within hollow space 260 through bearing sleeve 184. Bearing sleeve 184 may hold motor 182 fixedly in place while cylindrical roller blind housing 140 rotates about motor 182. The drive shaft of motor 182 is attached to gear 188, allowing the rotational driving of gear 188. Gear 188 also contains projecting structures 366 that are keyed for engagement with corresponding the internal protuberances 346 of cylindrical housing 140. The engagement of the projecting structures 366 of gear 188 with the internal protuberances 346 of the housing 140 ensure that the gear 188 allows motor 182 to rotate cylindrical blind housing 140 when winding (raising) and unwinding (lowering) of the blind 148. As can be seen in FIG. 4, bearing sleeve 184 and gear 188 include notches 370 (for bearing sleeve 184) and 374 (for gear 188) at the bottom to allow for longitudinal passageway 220. A person skilled in the art will recognize different methods and components that may be used for the motorized rotation of cylindrical roller blind housing 140. The bearings and motors are arranged within the hollow space 260 of cylindrical roller blind housing 140 are in a manner known to those skilled in the art.

As seen in FIG. 4, end cap 164 and end module 174 are provided, specifically end cap 164 is provided at the first end 150 of cylindrical roller housing 140 and end module 174 is provided at the second end 146 of cylindrical roller housing 140. End cap 164 and end module 174 are provided to close off the hollow 260 from the external environment. More specifically, end cap 164 is located at first end 150 adjacent the blind lowering and raising mechanism 130, and end module 174 is located at second end 146 adjacent to the blind lateral displacement mechanism 256. In the current embodiment, end cap 164 and end module 174 are attached to cylindrical roller housing 140 using screws. However, it will occur to a person skilled in the art that End module 174 includes opening 168 along its lower margin that corresponds substantially to the profile of longitudinal passageway 220. The opening 168 allows the rack gear to pass therethrough. End cap 164 and end module 174 can be connected to plates of housing 152, respectively, using a variety of means, including interference fit, clips or screws. An exemplary deployment of the roller blind assembly will now be described.

With reference to FIG. 2, deployment of straight roller blind assembly 120 includes unwinding the blind 128 from outer surface 126 of the cylindrical housing 124. This is achieved by rotating cylindrical housing 124 in a clockwise direction, thereby causing the blind 128 to unwind and lower. To raise blind 128, cylindrical housing 124 may be rotated in the opposite direction, in this embodiment a counter clockwise direction, thereby causing blind 128 to wind around the outer surface 126 of cylindrical housing 124. It will occur to a person skilled in the art that the rotational direction of cylindrical housing 124 to unwind and wind blind 128 is dependent on the orientation of the straight roller blind assembly 120 relative to window 112, and may be the inverse of the rotational directions indicated above.

Figure 6A:
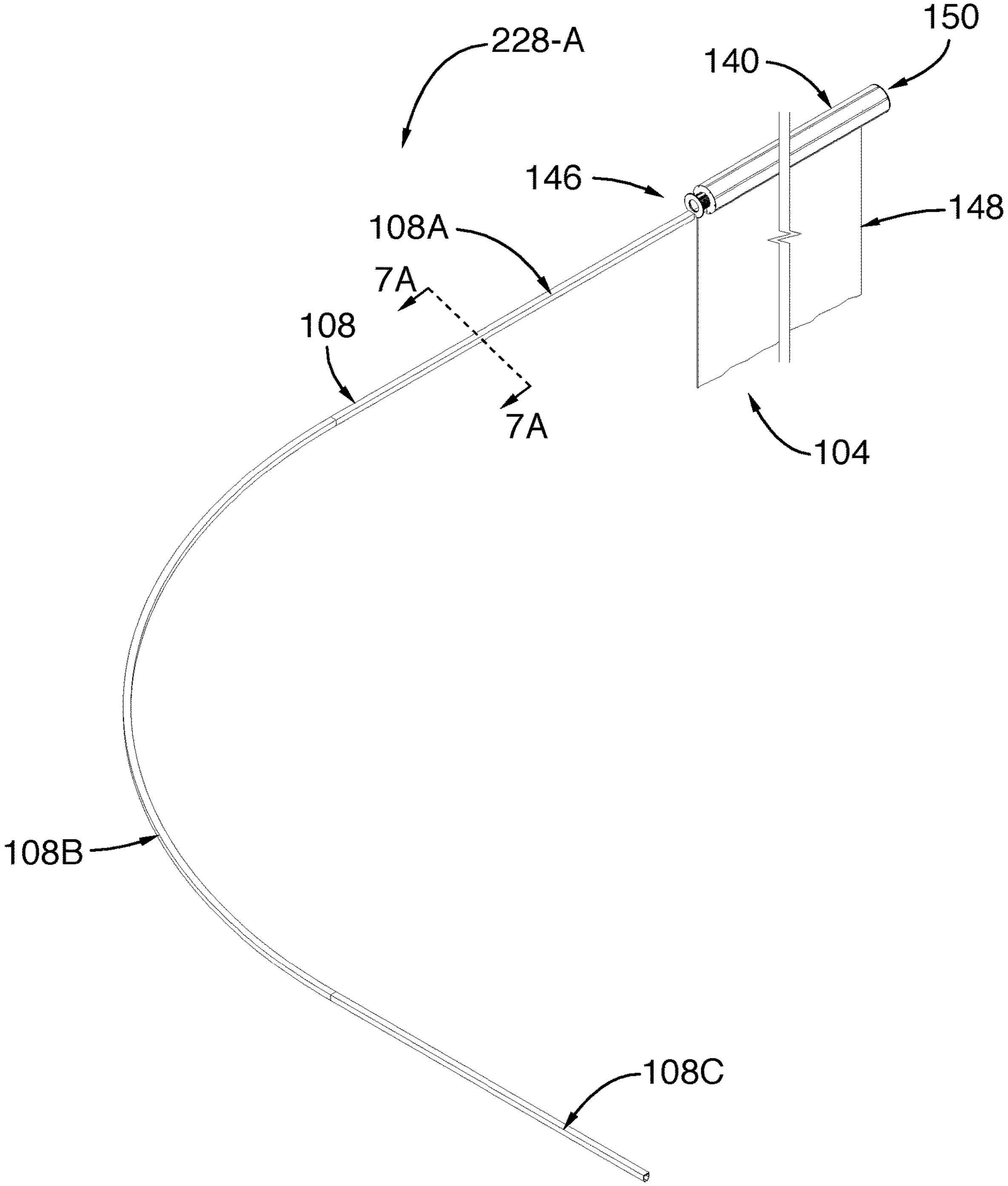
FIG. 6A is an isolated front left perspective view of the second roller blind assembly illustrated in FIG. 3 mounted onto the guide with the gear rack of the blind lateral displacement mechanism shown in its fully retracted position within the housing.

Referring to FIG. 6A, deployment of the curved roller blind assembly 104 begins by unwinding the blind 148 from the outer surface 138 of the cylindrical housing 140. This is achieved by actuating the blind lowering and raising mechanism 130 so that the cylindrical roller blind housing 140 is urged to rotate in a clockwise direction thereby causing the blind 148 to lower. More specifically, the motor 182 drives the shaft which imparts rotation to the cylindrical housing 140 via the gear 188. However, it will occur to a person skilled in the art that the rotational direction of cylindrical roller blind housing 140 to wind or unwind blind 148 is dependent on the orientation of the curved roller blind assembly 104 relative to the window 112. Once the blind 148 is fully lowered (i.e. in its fully unfurled position 228-A), no portion of the blind 148 will remain wound about the outer surface 138 of the cylindrical housing 140. The lowermost margin of blind 148 will be covering the bottom of the window 112. The longitudinal passageway 220 located at the lowermost margin 222 of cylindrical housing 140 will be aligned with the guide channel 358 of the guide 108 and the blind 148 will be hanging from gear rack 144 through the gap 224. In the fully unfurled position 228-A, gear rack 144 is also in its retracted position, where the gear rack 144 is contained within the longitudinal passageway 220, the upper portion of the blind 148 protrudes from the gap 224 in the lower margin 222 of the longitudinal passageway 220, and the window 112 remains uncovered by the blind.

Once it is in its fully unfurled position 228-A, the blind 148 may be driven along guide 108 using blind lateral displacement mechanism 256. Motor 132 may be actuated using a controller (not shown) to rotate worm 200 via drive shaft 290. As the worm 200 turns, its helical threading 350 engages the teeth 354 of the worm wheel 212 causing it to rotate as well. The teeth 354 of the worm wheel 212 engage the disc-like projections 310 protruding from the gear rack 144 causing the gear rack 144 to advance in the direction of travel (i.e. toward the first end 150 of cylindrical housing 140 and the window segments to be covered).

Figure 6B:
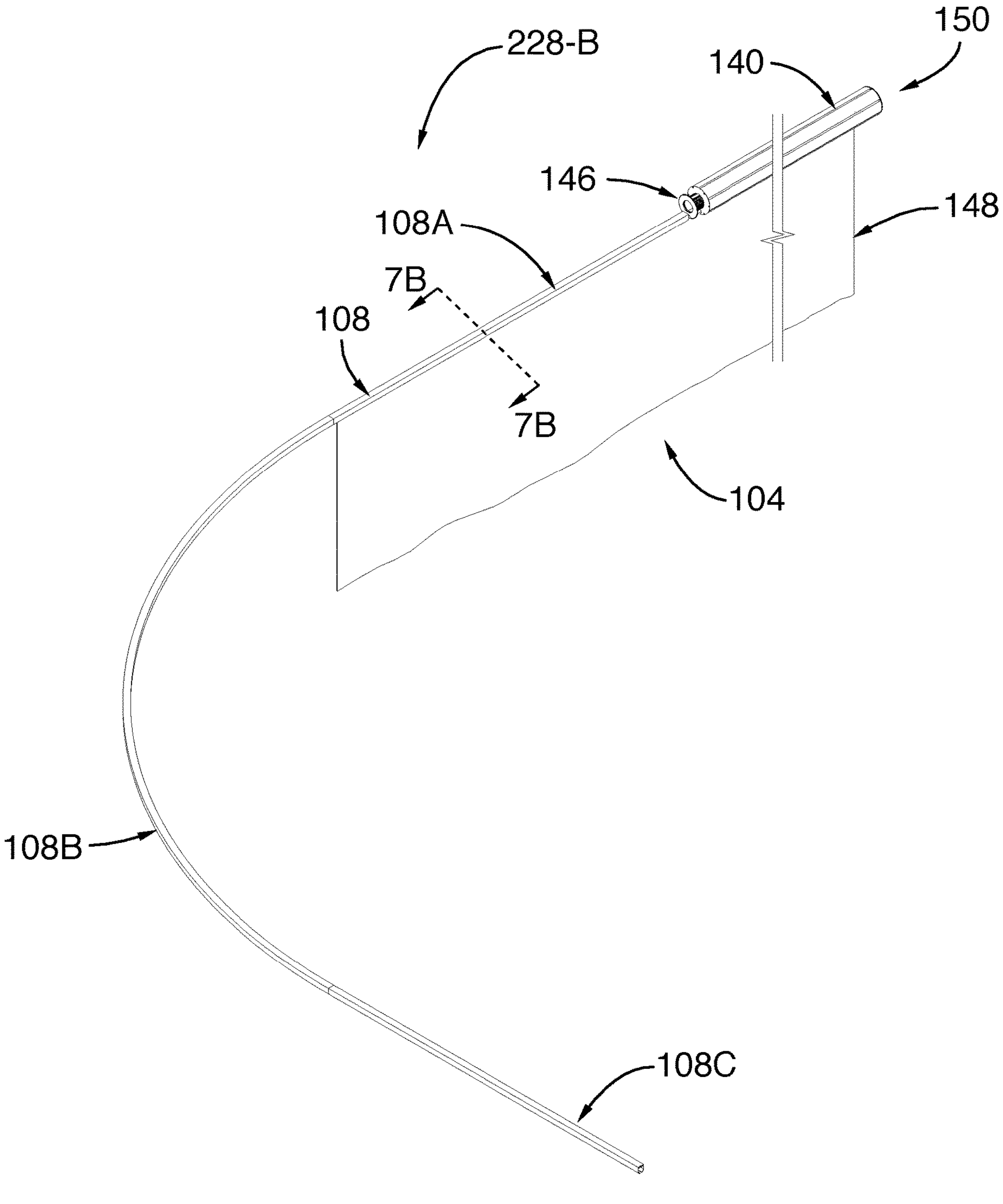
FIG. 6B is another isolated front left perspective view of the second roller blind assembly similar to that illustrated in FIG. 6A, except that the gear rack of the blind lateral displacement mechanism is shown in a first partially extended position, the gear rack extending to the end of a first straight section of the guide, to a position prior to a second curved section of the guide.
Figure 6C:
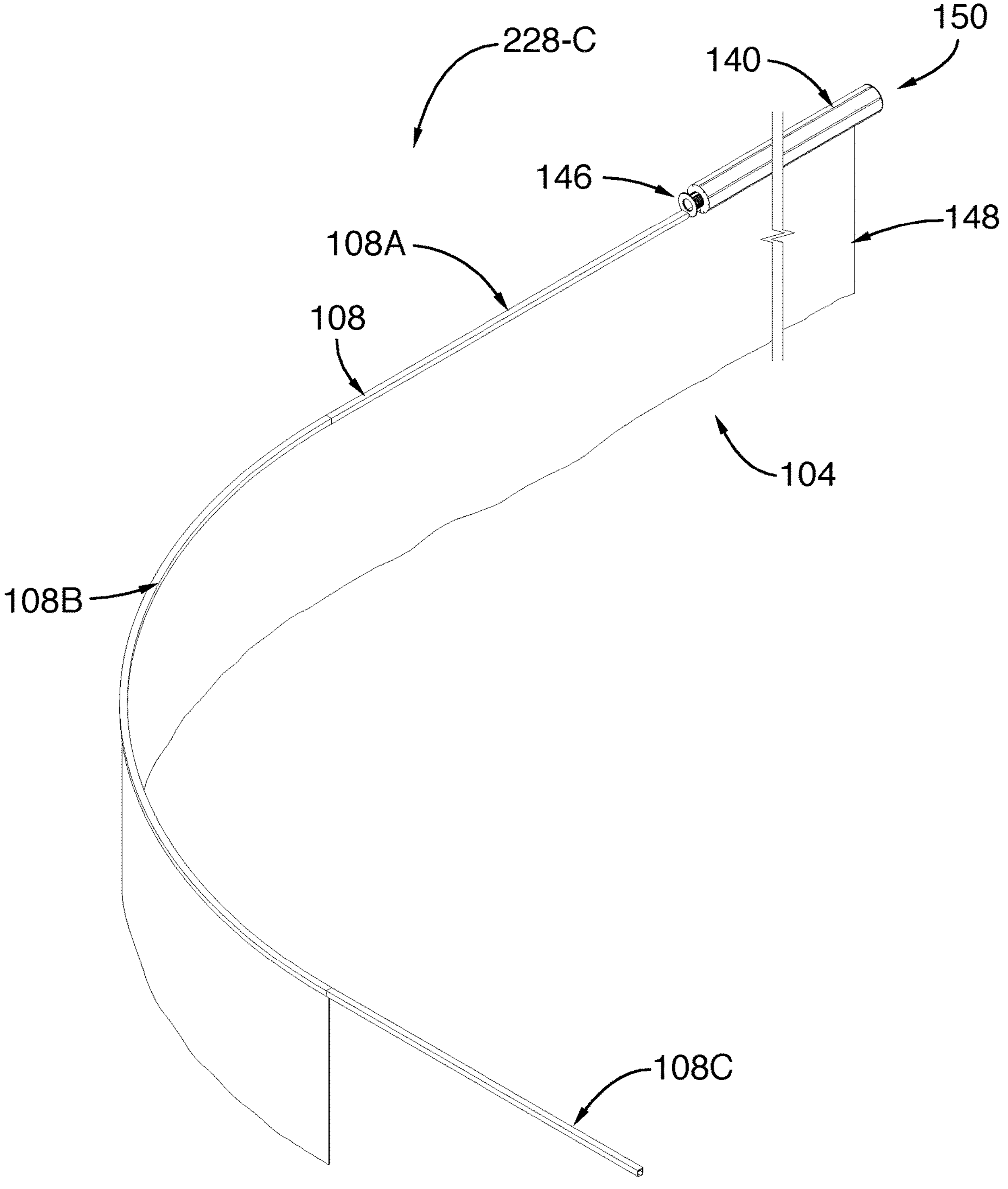
FIG. 6C is yet another isolated front left perspective view of the second roller blind assembly similar to that shown in FIG. 6A, except that the gear rack of the blind lateral displacement mechanism is shown in a second partially extended position, the gear rack extending to the end of the second curved section of the guide, to a position prior to a third straight section of the guide.
Figure 6D:
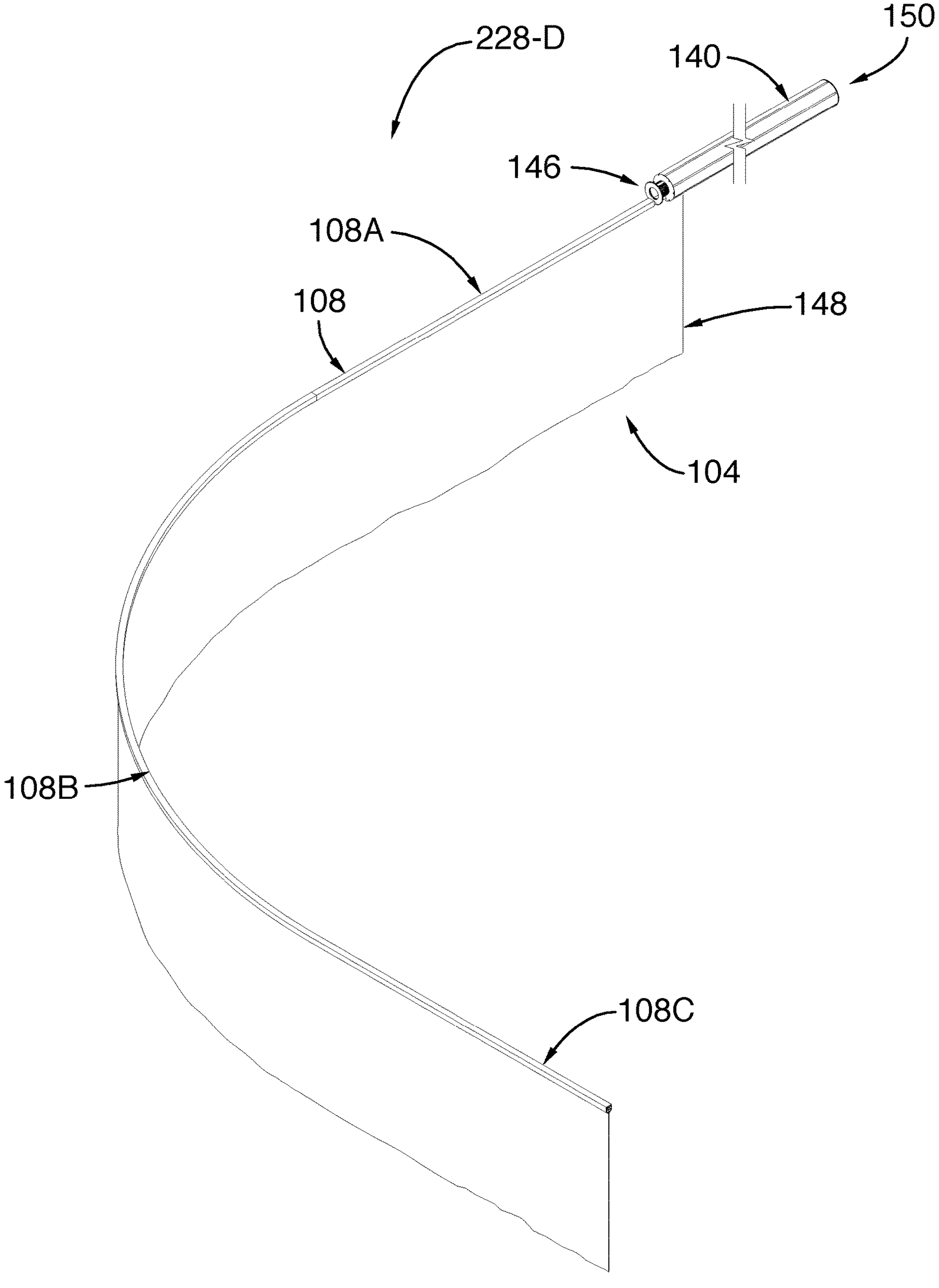
FIG. 6D is still another isolated front left perspective view of the second roller blind assembly similar to that shown in FIG. 6A, except that the gear rack of the blind lateral displacement mechanism is shown in a fully extended position, the gear rack extending to the end of the third straight section of the guide.

As gear rack 144 is driven laterally towards the first end 150, it exits longitudinal passageway 220 at opening 168, where it is subsequently received into the guide channel 358 of the guide 108. As motor 132 drives gear rack 144 forward, the gear rack 144 is urged to travel laterally along guide 108, as shown in FIG. 7B. As motor 132 continues to drive gear rack 144, guide 108 provides support and guidance for gear rack 144 and the gear rack 144 bends or flexes to adapt to the profile of the window segments to be covered. As can be seen in FIG. 6B, the gear rack 144 is driven towards a first partially extended position 228-B, where the gear rack 144 has extended to the end of the first straight section 108A of the guide 108, to a position prior to a second curved section of the guide 108B. In this position, first straight window segment 112A has been covered. As gear rack 144 continues to be driven forward towards a second partially extended position 228-C as depicted in FIG. 6C, the gear rack 144 has extended to the end of the of second curved section of the guide 108B. In this position, second straight window segment 112B has been covered. Referring to FIG. 6D, the gear rack 144 is driven towards the end of guide 108, the end of the third straight section of guide 108C. In this fully extended position 228-D, the third straight window segment 112C has been covered. In addition, in this fully extended position 228-D, a majority portion of the gear rack 144 is contained within the guide 108. A small portion of gear rack 144 remains in longitudinal passageway 220 in contact with worm wheel 212, allowing motor 132 to retract gear rack 144. Furthermore, in the fully extended position 228-D, the upper portion of blind 148 protrudes from gap 338 in the lower margin of guide channel 358.

A similar process reverse is performed to retract blind 148 using curved roller blind assembly 104. The blind 148 is retracted from its fully extended position of 228-D to the unfurled position of 228-A, where gear rack 144 is urged to exit the guide 108 to fully return into longitudinal passageway 220. Following the retraction of the blind 148, the blind lowering and raising mechanism 130 is actuated so that the cylindrical roller blind housing 140 is urged to rotate in a counter clockwise direction thereby causing the blind 148 to be raised until it reaches its fully wound position. More specifically, the motor 132 drives the shaft which imparts rotation to the cylindrical housing 140 via the gear.

Straight roller blind assembly 128 may be operated independently of curved roller blind assembly 104. For example, straight roller blind assembly 128 may lower blind 128, while at the same time, blind 148 is driven along guide 108 by blind lateral displacement mechanism 256 by curved roller blind assembly 104. As such, there are different configurations that roller blind system 100 may provide. For example, blind 128 may be lowered, while blind 148 is retracted/raised. Similarly, blind 148 may be covering multiple window segments, while blind 128 is retracted/raised. A person skilled in the art will recognize the various combinations of configurations in which roller blind system 100 may provide in covering multiple window segments.

The curved roller blind assembly 104 and the roller blind system 100 allows for several advantages over known systems. The roller blind system 100 can be conformed and customizable based on the number of window segments or the profile of the window 112 as a whole. Furthermore, the system 100 provides scalability to suit different window 112 configurations, whether covering only a single window segment, or multiple window segments. In addition, the roller blind system 100 is aesthetically pleasing and easy to deploy.

Although the foregoing description and accompanying drawings to specific preferred embodiments of the present invention as presently contemplated by the inventor, it will be understood that various changes, modifications and adaptations, may be made without departing from the spirit of the invention.

The embodiments for which an exclusive privilege or property is claimed are as follows:

1. A roller blind assembly configured for deployment along a curved window segment, the roller blind assembly comprising:
- a housing having a hollow body formed with a longitudinal passageway; the longitudinal passageway having a gap along a lower margin thereof; the housing being fixable to one of a ceiling and a wall;
- a guide mountable to one of the ceiling and the wall adjacent to the curved window segment; a profile of the guide being conformable to a curved profile of the curved window segment; the guide having a guide channel; the guide channel having a gap along a lower margin thereof and being alignable with the longitudinal passageway;
- a flexible toothed gear rack configured to be received within the longitudinal passageway and the guide for lateral displacement relative thereto; the toothed gear rack having an upper portion and a lower portion; the upper portion formed with spaced apart teeth;
- a drive assembly mountable within the hollow body of the housing; the drive assembly including a motor, a worm operatively connected to the motor and a toothed worm wheel configured to engage the teeth formed on the upper portion of the toothed gear rack to urge lateral displacement of the toothed gear rack relative to the longitudinal passageway and the guide; and
- a blind attachable to a lower portion of the toothed gear rack;
- when the roller blind assembly is deployed along a curved window segment, the toothed gear rack being moveable laterally between a fully retracted position and fully extended position,
- when the toothed gear rack is in the fully retracted position:

the toothed gear rack is contained within the longitudinal passageway;

the blind protrudes from the gap in the lower margin of the longitudinal passageway; and the curved window segment remains uncovered by the blind;

when the toothed gear rack is in the fully extended position:

a majority portion of the toothed gear rack is contained within the guide;

the blind protrudes from the gap in the lower margin of the guide channel; and the curved window segment is covered by the blind.

2. The roller blind assembly of claim 1, wherein the housing is cylindrical.

3. The roller blind assembly of claim 2 further comprising a blind lowering and raising mechanism operable to move the blind between a fully unfurled position and a fully wound position, when the toothed gear rack is in the fully retracted position.

4. The roller blind assembly of claim 3, wherein the housing has an outer surface around which the blind is wound when in the fully wound position.

5. The roller blind assembly of claim 4 wherein, the blind lowering and raising mechanism including:

a gear with an outer surface, the outer surface including projecting structures keyed for engagement with corresponding internal protuberances formed within the housing;

a motor operatively connected to the gear to rotatably drive the gear and the housing; and a bearing sleeve attached to the motor and an inner surface of the hollow body of the housing, the bearing sleeve configured to hold the motor fixedly in place while the housing rotates about the motor.

6. The roller blind assembly of claim 3, wherein:

the housing has a first end and a second end:

the blind lowering and raising mechanism is arranged within the housing in proximity to the first end thereof; and the drive assembly is arranged within the housing in proximity to the second end thereof.

7. The roller blind assembly of claim 1, wherein the drive assembly further includes at least one motor mount for fixedly holding the drive assembly within the housing.

8. The roller blind assembly of claim 7, wherein the at least one motor mount is a plate with outer edges keyed for engagement with corresponding internal protuberances formed within the housing.

9. The roller blind assembly of claim 1 further comprising an access gap between the longitudinal passageway and the hollow body of the housing, wherein the toothed worm wheel of the drive assembly is configured to engage the teeth formed on the upper portion of the toothed gear rack through the access gap.

10. The roller blind assembly of claim 1, wherein the toothed gear rack has a generally circular profile.

11. The roller blind assembly of claim 1, wherein the longitudinal passageway has a generally penannular profile.

12. The roller blind assembly of claim 1, wherein the guide has an upper portion, two opposing side portions depending from either ends of the upper portion and two curved converging lower portions extending away from the side portions, the gap along the lower margin of the longitudinal passageway being located between the two curved converging lower portions.

13. The roller blind assembly of claim 1, wherein the guide is substantially the same length as the gear rack.

14. The roller blind assembly of claim 1, wherein the guide is made of a smooth material.

15. The roller blind assembly of claim 14, wherein the smooth material is selected from the group consisting of: (a) a metal; and (b) a polymer.

16. The roller blind assembly of claim 1, wherein the lower portion of the toothed gear rack includes a clamping mechanism for fixedly retaining an edge of the blind.

17. The roller blind assembly of claim 16, wherein the clamping mechanism includes two opposing arm portions for holding the blind therebetween.

18. The roller blind assembly of claim 1, wherein the housing is made of aluminium.

19. A roller blind assembly configured for deployment along a curved window segment, the roller blind assembly comprising:

a housing having a hollow body formed within a longitudinal passageway; the longitudinal passageway having a gap along a lower margin thereof; the housing being fixed to one of a ceiling and a wall;

a guide mounted to one of the ceiling and the wall adjacent to the curved window segment; a profile of the guide conforming to a curved profile of the curved window segment; the guide having a guide channel; the guide channel having a gap along a lower margin thereof and being aligned with the longitudinal passageway;

a flexible toothed gear rack configured to be received within the longitudinal passageway and the guide for lateral displacement relative thereto; the toothed gear rack having an upper portion and a lower portion; the upper portion formed with spaced apart teeth;

a drive assembly mounted within the hollow body of the housing, the drive assembly including a motor, a worm operatively connected to the motor and a toothed worm wheel configured to engage the teeth formed on the upper portion of the toothed gear rack to urge lateral displacement of the toothed gear rack relative to the longitudinal passageway and the guide; and a blind attached to a lower portion of the toothed gear rack;

the toothed gear rack being movable laterally between a fully retracted position and fully extended position, when the toothed gear rack is in the fully retracted position:

the toothed gear rack is contained within the longitudinal passageway;

the blind protrudes from the gap in the lower margin of the longitudinal passageway; and the curved window segment remains uncovered by the blind;

when the toothed gear rack is in the fully extended position:

a majority portion of the toothed gear rack is contained within the guide;

the blind protrudes from the gap in the lower margin of the guide channel; and the curved window segment is covered by the blind.

20. A roller blind assembly configured for deployment along straight and curved window segments, the roller blind assembly comprising:

a housing having a hollow body formed within a longitudinal passageway; the longitudinal passageway having a gap along a lower margin thereof; the housing being fixed to one of a ceiling and a wall;

a guide mounted to one of the ceiling and the wall adjacent to the straight and curved window segments; the guide including at least a straight portion and a curved portion, a first profile of the straight portion guide conforming to a straight profile of the straight window segment; a second profile of the curved portion conformed to a curved profile of the curved window segment; the guide having a guide channel; the guide channel having a gap along a lower margin thereof and being aligned with the longitudinal passageway;

a flexible toothed gear rack configured to be received within the longitudinal passageway and the guide for lateral displacement relative thereto; the toothed gear rack having an upper portion and a lower portion; the upper portion formed with spaced apart teeth;

a drive assembly mounted within the hollow body of the housing, the drive assembly including a motor, a worm operatively connected to the motor and a toothed worm wheel configured to engage the teeth formed on the upper portion of the toothed gear rack to urge lateral displacement of the toothed gear rack relative to the longitudinal passageway and the guide; and a blind attached to a lower portion of the toothed gear rack;

the toothed gear rack being movable laterally between a fully retracted position and fully extended position, when the toothed gear rack is in the fully retracted position:

the toothed gear rack is contained within the longitudinal passageway;

the blind protrudes from the gap in the lower margin of the longitudinal passageway; and the straight and the curved window segments remain uncovered by the blind;

when the toothed gear rack is in the fully extended position:

a majority portion of the toothed gear rack is contained within the guide;

the blind protrudes from the gap in the lower margin of the guide channel; and the straight and the curved window segments are covered by the blind.

* * * * *